United States Patent [19]

Nawrata

[11] 4,265,698
[45] May 5, 1981

[54] PROCESS OF FORMING A SOUND NEEDLE AND SOUND NEEDLE CONSTRUCTION

[75] Inventor: Gunter Nawrata, Mistelbach, Langendorf, Austria

[73] Assignee: AKG Akustische u.Kino-geräte gesellschaft m.b.H., Austria

[21] Appl. No.: 103,493

[22] Filed: Dec. 14, 1979

[30] Foreign Application Priority Data

Oct. 12, 1979 [AT] Austria .................................. 6663/79

[51] Int. Cl.³ .............................................. C23F 1/02
[52] U.S. Cl. .................................... 156/630; 156/634; 156/656; 156/153; 369/71; 369/173
[58] Field of Search ............... 156/629, 630, 633, 634, 156/651, 655, 656, 664, 153, 293, 645; 274/38; 228/122, 159, 162, 903; 179/100.41 R

[56] References Cited
U.S. PATENT DOCUMENTS 2,599,312  6/1952  Andres ..................................... 274/38
3,199,967  8/1965  Pixley .............................. 156/634 X Primary Examiner—William A. Powell Attorney, Agent, or Firm—McGlew and Tuttle

[57] ABSTRACT

A process of forming a sound needle for the scanning of mechanical sound carriers preferably records after the needle has been secured to a holder having a diameter comparable to the maximum diameter of the needle on the surface thereof opposite the needle tip and using a carrier having an opening therethrough, comprises reducing the diameter of the holder until it is a fraction of its original diameter, inserting the holder into the opening of the carrier and applying a securing material between the surface of the needle adjacent to and radially outwardly of the holder and to the carrier in the same area so as to secure the needle to the carrier, and reducing at least the major portion of the holder after the needle is secured to the carrier so as to leave only substantially a needle secured to the carrier. The needle construction comprises the sound carrier having an opening therethrough, and a needle secured to the sound carrier in the area of the sound carrier surrounding the opening with the needle centered substantially on the opening.

3 Claims, 4 Drawing Figures

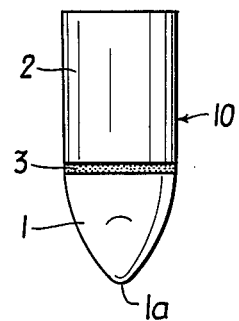
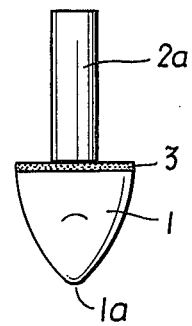
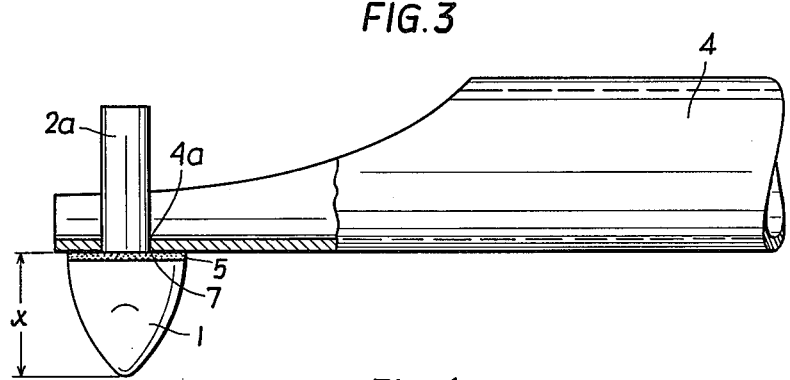
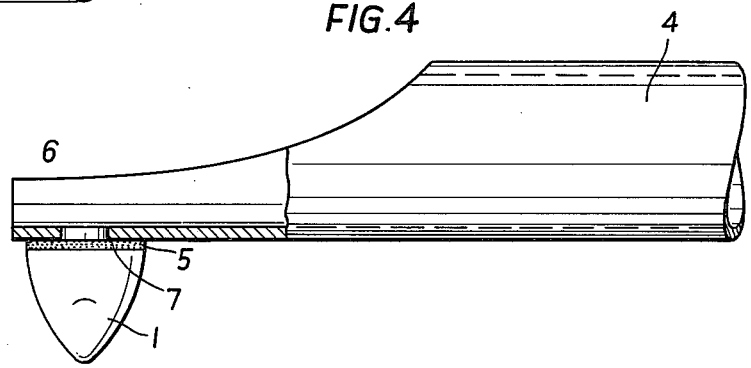

PROCESS OF FORMING A SOUND NEEDLE AND SOUND NEEDLE CONSTRUCTION

FIELD AND BACKGROUND OF THE INVENTION

The invention relates to a manufacturing and assembly method and construction for a sound pickup needle for the scanning of mechanical sound carriers, preferably records.

A distinction is made in such needles between the so called unmounted and mounted needles. While the former consist of integral parts, preferably diamond, the latter only have a point consisting of the actual needle material whereas the rest of the needle is made of another material which, under circumstances, can be considerably softer. The needle point is then cemented or soldered to this material.

In the description of the invention which now follows, diamond is assumed to be the needle material for the sake of simplicity, although other suitable materials such as sapphire or ruby can also be processed by the same manufacturing process according to the invention.

Traditional, unmounted diamonds have the advantage, among others, of a small mass because the specific gravity of diamond is lower than that of the carrier materials usually used for mounted needles.

Disadvantages of unmounted diamonds are the requirement for a more complicated grinding operation and difficulties encountered therein in obtaining exactly ground shapes, a higher raw material price, and a relatively great mass.

As mentioned, mounted diamonds consist of a diamond point and a usually cylindrical shaft of steel or another suitable carrier material.

Used as a point in a diamond chip which is first soldered to the carrier and then ground to the desired shape in the subsequent grinding operation.

Such a mounted needle is easier to machine because handling the carrier is easier, and an optical inspection of the ground needle through light reflection to the usually light-impermeable carrier is also possible more easily than when transparent, unmounted diamonds are involved.

In both cases, the assembly of the needles into the needle carrier tube of the sound pickup, which transfers the needle motion when scanning the record to an element serving the transformation into electrical signals, is difficult. This carrier tube usually has a through hole into which the needle is inserted. After straightening of the needle, it is cemented in the carrier tube. When elliptical or similar ground shapes are involved, this straightening is most important, since scanning errors will result otherwise which, in extreme cases, can lead to damage to the records being played.

SUMMARY OF THE INVENTION

Through a suitable manufacturing process, the invention provides a needle which has a mass as small as possible, can be ground easily and precisely, and offers significant advantages when assembling the finished needle into the needle carrier tube.

In accordance with the invention a sound needle for the scanning of mechanical sound carriers such as records is first secured to a holder which has a diameter substantially equal to the maximum diameter of the needle at the side thereof which is opposite to the needle tip. The diameter of the holder is then reduced so that it is less than the diameter of the needle and it is a fraction of its original diameter. The holder is then inserted into the slot of a carrier and the needle is secured to the carrier in the area around the slot such as by soldering or by applying adhesive. After this is done substantially the entire holder is reduced and carried away such as by etching to leave only a needle secured to the carrier in an area bounding a hole through the carrier.

Accordingly, it is an object of the invention to provide an improved means for mounting a needle to a carrier which includes first joining the needle to a holder and after the needle has been ground to a proper constituency, reducing the diameter of the holder so that it may be inserted into a slot of a needle carrier. With the holder in the slot of the carrier the needle itself is secured to the carrier in an area extending around the slot and radially outwardly thereof. The holder is then removed such as by etching or by other means so that only the needle is secured to the carrier in an area around the opening.

A further object of the invention is to provide a needle construction in which the needle is joined to a carrier in an area bounding an opening through the carrier.

A further object of the invention is to provide a needle assembly which is simple is design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 1 is a side elevational view of a needle mounted on a holder prior to its being mounted on a carrier;

FIG. 2 is a view of the needle and holder after the holder has been reduced in diameter;

FIG. 3 is a side elevational view partly in section showing the holder engaged in a slot of a needle carrier; and FIG. 4 is a view similar to FIG. 3 showing the final construction of the carrier and needle.

DESCRIPTION OF THE PREFERRED EMBODIMENT

In accordance with the invention a process is provided for forming a sound needle for the scanning of mechanical sound carriers such as records. With the inventive process a needle 1 is first joined to a holder 2 such as by soldering or adhesive 3 to form a unit 10 which may be manipulated for example, for the purpose of grinding the needle 1 to a proper tip. After this is done the holder 2 is reduced in size such as by applying etching material thereto until its diameter is a fraction of its original diameter and it is less than the diameter of the maximum surface of the needle 1 which is opposite to the tip 1a thereof.

As shown in FIG. 3 the holder 2a is inserted into a slot 4a of a needle carrier 4 and advantageously at the same time the needle 1 is secured to the carrier 4 such as by adhesive or solder 7 in an annular area surrounding the slot 4a and located radially outwardly of the holder 2a. After this step is completed the holder is reduced such as by etching or similar means so that substantially all of it is removed or only a minor portion 6 remains which substantially fills the opening 4a.

The various phases of the method are explained below in greater detail: The starting point for the manufacturing method according to the invention is a mounted needle generally designated 10. The needle 10 can be ground easily after the raw diamond or tip 1 is soldered to a holder or carrier designated 2 in FIG. 1. Thus, after the mounted needle 10 is produced in the traditional way, the diameter of the carrier 2 is reduced to, say, one third of its original size, such as by an etching operation to form a reduced carrier part 2a. FIG. 2 shows the part 2a of the needle carrier remaining after etching. In choosing the etching medium, it must be borne in mind that the diamond 1 as well as, if applicable, the solder 3 used must be resistant to etching solution. It is possible to achieve, by appropriate control of the etching speed, that the remaining part 2a of the carrier is again of precisely cylindrical shape.

It may, under circumstances, be advantageous for the subsequent production phases to remove by the etching operation, also the solder 3 from the diamond surfaces bared by etching. This can be done either during the chemical erosion of the needle carrier itself or in another etching bath which attacks only the solder 3 itself.

The operation of reducing the needle carrier diameter is necessary because soldering or cementing the raw diamond to such a thin tube is possible either not at all or only under the greatest of difficulties and, furthermore, because subsequent grinding attempts would fail due to the impossibility of gripping the thin needle carrier. Even an already ground diamond point could be attached to such a carrier at an unjustifiable cost only.

Accordingly, the first production phase results in the advantage of making it possible at all to produce economically a precisely ground needle according to FIG. 2.

As the next phase of the method the needle according to FIG. 2 is now inserted into a needle carrier tube 4, as shown schematically in FIG. 3.

The needle carrier tube 4 advantageously comprises a thin-walled aluminum tube shaped at its needle end to form a flat spade which accommodates the needle in a through opening in the form of a hole or slot 4a perpendicular to the axial direction.

Another needle carrier tube shape, of course, has no effect on the advantages of the invention as long as it has been made certain that an opening (hole or slot 4a) either perpendicular or oblique to the axis of the needle carrier tube serves the accommodation or seating of the needle.

In particular, the effect according to the invention can be utilized also if a rod of solid material or any desired needle carrier profile is used instead of a needle carrier tube.

In conventional needle assemblies in which the needle, unmounted or mounted alike, is pushed through the carrier tube and cemented there ensures the problem, caused by the small dimensions, of being able to adjust the needle precisely relative to its vertical axis, and also relative to the grinding axes when ground shapes other than radial are involved.

This is where another benefit of the invention comes in, as shown in FIG. 3. Due to the reduced diameter of the carrier 2a relative to the diamond, the needle can be inserted in the hole in the needle carrier tube, automatically assuring the correct level of the needle point beyond the underside of the carrier tube. This dimension, important for uniform quality in a mass product, is marked x in FIG. 3. A step-by-step adjustment of the needle level is obviated as is the danger of the needle dropping out of the carrier tube 4 during assembly.

To assemble and adjust the needle in the carrier tube 4, the tube is turned about its axis as compared to FIG. 3, and the needle inserted from the top. FIG. 3, in fact, shows the needle assembly in its later operating position.

After the needle has been adjusted, it is cemented or soldered to the carrier tube 4 in the area 5, or the needle may be provided with adhesive or solder 7 before being inserted in the tube 4 and the adjustment made during the pot life of the adhesive, or the solder which might be melted by heating subsequent to the adjustment.

Accordingly, a considerably simpler assembly and adjustment method can be cited as advantageous of this production phase according to the invention. In addition, assembly problems always crop up in the conventional methods because the joining materials, i.e. adhesive or solder, are always being sucked into the needle carrier tube due to its capillarity, thereby increasing the mass of the needle assembly. The needle according to the invention makes possible a safe mechanical connection, using a minimum amount of adhesives because cementing takes place essentially on the needle side only and the assembly hole is smaller to boot.

FIG. 4, finally, shows the last step in the manufacture of the needle assembly. The carrier (2a in FIG. 3), now no longer needed, is removed by another etching operation so that a needle in the form of an unmounted diamond now originates.

Mechanical or thermal methods may naturally also be chosen instead of the etching operation.

The advantage is obvious. Since the needle itself now consists of the actual point only and neither a carrier rod nor a diamond rod extension as in unmounted needles are present, such an assembly now has only a fraction of the mass of conventional needles.

If the average mass of mounted needles ranges between 0.2 and 0.5 mg and that of mounted diamonds about 0.08 mg, values below 0.03 mg are obtained with the assembly according to the invention.

Manufacturing and assembly method for a sound needle for the scanning of mechanical sound carriers, preferably records, characterized in that the carrier 2 of a mounted needle is eroded away by an etching operation to a fraction of its original diameter; that the needle thus produced, after insertion into a through opening in the form of a hole or slot, is mechanically strongly jointed to a needle carrier 4 perpendicular to the axis of the needle carrier 4 in the area 5 of the mounted needle 1 bared by etching; and that the carrier 2a is subsequently removed by another operation, preferably again by etching.

While a specific embodiment of the invention has been shown and described in detail to illustrate the application of the principles of the invention, it will be understood that the invention may be embodied otherwise without departing from such principles.

What is claimed is:

1. A process of forming a sound needle for the scanning of mechanical sound carriers preferably records after a needle has been secured to a holder which has a diameter comparable to the maximum diameter of the needle on a surface thereof opposite to the needle tip and using a carrier having an opening therethrough, comprising reducing the diameter of the holder until it is a fraction of its original diameter, inserting the holder into the opening of the carrier and applying a securing material between the surface of the needle adjacent to and radially outwardly of the holder and between the carrier and the needle so as to secure the needle to the carrier, and reducing at least a major portion of the holder after the needle is secured to the carrier.

2. A process according to claim 1 wherein the holder is reduced by eroding it away by etching.

3. A process according to claim 1 wherein the needle is adhesively secured to the carrier in a marginal area located around the opening through the carrier and between the carrier and the needle.

* * * * *